United States Patent
Jin et al.

(10) Patent No.: US 11,095,569 B2
(45) Date of Patent: Aug. 17, 2021

(54) METHOD FOR MANAGING HARDWARD RESOURCE, METHOD FOR QUERYING LOCATION OF HARDWARE RESOURCE, AND RELATED APPARATUS

(71) Applicant: Huawei Technologies Co., Ltd., Shenzhen (CN)

(72) Inventors: Tao Jin, Beijing (CN); Qingchun Lin, Beijing (CN); Chengyan Feng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 173 days.

(21) Appl. No.: 15/587,454

(22) Filed: May 5, 2017

(65) Prior Publication Data

US 2017/0244647 A1 Aug. 24, 2017

Related U.S. Application Data

(63) Continuation of application No. PCT/CN2014/090630, filed on Nov. 7, 2014.

(51) Int. Cl.
*H04L 12/911* (2013.01)
*H04L 29/08* (2006.01)
*G06F 9/455* (2018.01)

(52) U.S. Cl.
CPC .......... *H04L 47/70* (2013.01); *G06F 9/45504* (2013.01); *H04L 29/08* (2013.01); *H04L 67/10* (2013.01); *H04L 67/18* (2013.01)

(58) Field of Classification Search
CPC ......... H04L 47/70; H04L 29/08; H04L 67/10; G06F 9/45505
See application file for complete search history.

(56) References Cited

U.S. PATENT DOCUMENTS

| | | | |
|---|---|---|---|
| 8,473,587 B1 | 6/2013 | Lappas et al. | |
| 2005/0246707 A1* | 11/2005 | Ismail | G06F 9/5011 718/100 |
| 2008/0201414 A1* | 8/2008 | Amir Husain | G06F 9/445 709/203 |

(Continued)

FOREIGN PATENT DOCUMENTS

| | | |
|---|---|---|
| CN | 101821992 A | 9/2010 |
| CN | 104012066 A | 8/2014 |

(Continued)

*Primary Examiner* — Angela Nguyen
(74) *Attorney, Agent, or Firm* — Slater Matsil, LLP (57) ABSTRACT

The present embodiments provide a method for managing a hardware resource, a method for querying a location of a hardware resource, and a related apparatus. The method for managing a hardware resource includes receiving, by a virtualized infrastructure manager (VIM), a hardware resource allocation request message sent by a VNF management entity, where the hardware resource allocation request message is used to request the VIM to allocate a hardware resource to a virtual machine that runs a VNFC, and the hardware resource allocation request message includes location information of the hardware resource that the virtual machine requests to allocate. The method also includes allocating, by the VIM, the hardware resource at a corresponding location to the virtual machine according to the location information of the hardware resource.

12 Claims, 5 Drawing Sheets

(56) References Cited

U.S. PATENT DOCUMENTS

| | | | |
|---|---|---|---|
| 2009/0024764 A1* | 1/2009 | Atherton | H04L 29/12254 |
| | | | 709/250 |
| 2011/0119381 A1* | 5/2011 | Glover | G06F 9/5072 |
| | | | 709/226 |
| 2013/0091089 A1* | 4/2013 | Noureddine | G06F 9/5011 |
| | | | 707/602 |
| 2014/0108506 A1 | 4/2014 | Borzycki et al. | |
| 2015/0229583 A1* | 8/2015 | Ponsford | G06F 9/45533 |
| | | | 709/226 |
| 2015/0373096 A1* | 12/2015 | Chandrasekaran | H04W 4/023 |
| | | | 709/226 |

FOREIGN PATENT DOCUMENTS

| | | |
|---|---|---|
| CN | 104050045 A | 9/2014 |
| WO | 2013122597 A1 | 8/2013 |

\* cited by examiner

METHOD FOR MANAGING HARDWARD RESOURCE, METHOD FOR QUERYING LOCATION OF HARDWARE RESOURCE, AND RELATED APPARATUS

CROSS-REFERENCE TO RELATED APPLICATIONS

This application is a continuation of International Patent Application No. PCT/CN2014/090630, filed on Nov. 7, 2014, the disclosure of which is hereby incorporated by reference in its entirety.

TECHNICAL FIELD

Embodiments of the present invention relate to the field of communications technologies, and in particular, to a method for managing a hardware resource, a method for querying a location of a hardware resource, and a related apparatus.

BACKGROUND

As ideas and technologies such as cloud computing and virtualization mature, an architecture transformation in the field of a traditional telecommunications network is coming. Closeness is replaced by openness, exclusiveness is replaced by generality, and an originally professional network function that is on a communications network element is extracted and virtualized, and then runs on a general hardware platform; this change is referred to as network functions virtualization (NFV).

An objective of NFV is expecting to implement flexible loading of software, and flexible configuration of the software at locations such as a data center, a wide area network, and a campus network by using standard hardware to bear various network software functions, exponentially accelerate a speed of network deployment and adjustment, reduce complexity and overall investment cost that are of service deployment, and improve unification, generalization, and adaptation that are of a network device. For a communications network, software functions of some original standard network elements, such as a gateway general packet radio service (GPRS) support node (GGSN), a mobility management entity (MME), and other devices, are virtualized and borne on a general hardware device of a data center.

Lawful interception refers to that: On the premise that no impact is caused on network element security and all services of a mobile communications system, real-time tracing is implemented for all traffic and non-traffic activities of a controlled number, where types of controlled numbers include a Mobile Subscriber International Integrated Services Digital Network/Public Switched Telephone Network number (MSISDN), an International Mobile Subscriber Identification Number (IMSI), and an International Mobile Equipment Identity (IMEI).

In the prior art, for virtualization of a network element function, in a process of performing instantiation on a virtualized network function (VNF), an instantiation template and a parameter related to hardware information generally include only hardware resource information such as a quantity of Central Processing Units (CPU), a memory size, and a hard disk capacity.

For an ordinary service, the service can normally run as long as a CPU, a memory size, a hard disk size, and the like that are required by the service are provided. However, for a sensitive service such as lawful interception, because of a requirement for confidentiality, according to laws and regulations, a related physical device, and in particular, a storage device that stores information related to lawful interception is generally sealed, or another confidentiality measure is taken to prohibit an unauthorized person from touching and operating the related physical device. In addition, after the service is migrated or terminated, a hard disk may need to be destructed according to the requirement for confidentiality. In this case, knowing information such as a CPU, a memory size, a disk size that are required by the service cannot meet a requirement. Therefore, it is necessary to provide a new method to resolve the foregoing problem.

SUMMARY

In view of this, embodiments of the present invention provide a method for managing a hardware resource, a method for querying a location of a hardware resource, and a related apparatus, which can meet a requirement of a sensitive service.

According to a first aspect, a method for managing a hardware resource provided in an embodiment of the present invention includes: receiving, by a virtualized infrastructure manager (VIM), a hardware resource allocation request message sent by a virtualized network function (VNF) management entity, where the hardware resource allocation request message is used to request the VIM to allocate a hardware resource to a virtual machine that runs a virtualized network function component (VNFC), and the hardware resource allocation request message includes location information of the hardware resource that the virtual machine requests to allocate; and allocating, by the VIM, the hardware resource at a corresponding location to the virtual machine according to the location information of the hardware resource.

With reference to the first aspect, in a first implementation manner of the first aspect, the location information of the hardware resource includes any one or any combination of the following: city information, equipment room information, cabinet information, a device identity, a port network identity, and a network interface identity.

With reference to the first aspect or the first implementation manner of the first aspect, in a second implementation manner of the first aspect, the hardware resource allocation request message further includes an exclusive identity or a shared identity, the exclusive identity is used to identify that the hardware resource, at the specified location, that the virtual machine requests to allocate is exclusively occupied by the virtual machine, and the shared identity is used to identify that the hardware resource, at the specified location, that the virtual machine requests to allocate may be shared with another virtual machine.

With reference to the second implementation manner of the first aspect, in a third implementation manner of the first aspect, 1 is used to indicate the exclusive identity, and 0 is used to indicate the shared identity; or o is used to indicate the exclusive identity, and 1 is used to indicate the shared identity.

With reference to the first aspect, or the first implementation manner of the first aspect, or the second implementation manner of the first aspect, or the third implementation manner of the first aspect, in a fourth implementation manner of the first aspect, the method further includes: receiving, by the VIM, a hardware resource adjustment request message sent by the VNF management entity, where the hardware resource adjustment request message includes location information and adjustment information that are of a hardware resource that the VNFC requests to adjust; and adjusting, by the VIM, the hardware resource at a corresponding location according to the hardware resource adjustment request message.

With reference to the first aspect, or the first implementation manner of the first aspect, or the second implementation manner of the first aspect, or the third implementation manner of the first aspect, or the fourth implementation manner of the first aspect, in a fifth implementation manner of the first aspect, the VNF management entity includes a virtualized network function manager VNFM or a network functions virtualization orchestrator (NFVO).

According to a second aspect, a method for managing a hardware resource provided in an embodiment of the present invention includes: acquiring, by a VNF management entity, an instantiated VNF message, where the instantiated VNF message includes location information of a hardware resource that a virtual machine running a VNFC requests to allocate; and sending, by the VNF management entity, a hardware resource allocation request message to a VIM according to the instantiated VNF message, where the hardware resource allocation request message is used to request the VIM to allocate the hardware resource to the virtual machine, and the hardware resource allocation request message includes the location information of the hardware resource that the virtual machine requests to allocate.

With reference to the second aspect, in a first implementation manner of the second aspect, the location information of the hardware resource includes any one or any combination of the following: city information, equipment room information, cabinet information, a device identity, a port network identity, and a network interface identity.

With reference to the second aspect or the first implementation manner of the second aspect, in a second implementation manner of the second aspect, the VNF management entity includes a virtualized network function manager VNFM; and the acquiring, by a VNF management entity, the instantiated VNF message includes: receiving, by the VNFM, the instantiated VNF message sent by an operator or element management (EM).

With reference to the second aspect or the first implementation manner of the second aspect, in a third implementation manner of the second aspect, the VNF management entity includes a NFVO; and the acquiring, by a VNF management entity, the instantiated VNF message includes: receiving, by the NFVO, the instantiated VNF message sent by an operator or an operation support system (OSS).

With reference to the second aspect, or the first implementation manner of the second aspect, or the second implementation manner of the second aspect, or the third implementation manner of the second aspect, in a fourth implementation manner of the second aspect, the sending, by the VNF management entity, a hardware resource allocation request message to the VIM according to the instantiated VNF message includes: determining, by the VNF management entity according to the location information of the hardware resource, a VIM that manages the hardware resource; and sending, by the VNF management entity, the hardware resource allocation request message to the VIM that manages the hardware resource.

With reference to the second aspect, or the first implementation manner of the second aspect, or the second implementation manner of the second aspect, or the third implementation manner of the second aspect, or the fourth implementation manner of the second aspect, in a fifth implementation manner of the second aspect, the method further includes: receiving, by the VNF management entity, a hardware resource adjustment request message sent by the VNFC, where the hardware resource adjustment request message includes location information and adjustment information that are of a hardware resource that the VNFC requests to adjust; and forwarding, by the VNF management entity, the hardware resource adjustment request message to the VIM, so as to request the VIM to adjust the hardware resource at a corresponding location.

According to a third aspect, a method for querying a location of a hardware resource provided in an embodiment of the present invention includes: determining, by a VNF management entity, a VNFC that needs to be queried; searching for, by the VNF management entity according to a mapping relationship, a virtual machine that runs the VNFC that needs to be queried; sending, by the VNF management entity, a VM query request to a VIM that manages the virtual machine, so as to request the VIM to query hardware resource information of the virtual machine, where the VM query request includes a virtual machine identity or virtual container identity of the virtual machine; and receiving, by the VNF management entity, the hardware resource information that is of the virtual machine and returned by the VIM, where the hardware resource information includes location information of the hardware resource.

With reference to the third aspect, in a first implementation manner of the third aspect, the location information of the hardware resource includes any one or any combination of the following: city information, equipment room information, cabinet information, a device identity, a port network identity, and a network interface identity.

With reference to the third aspect or the first implementation manner of the third aspect, in a second implementation manner of the third aspect, the determining, by a VNF management entity, a VNFC that needs to be queried includes: determining, by the VNF management entity according to a query request sent by an external system, the VNFC that needs to be queried, where the query request includes identity information of the VNFC that needs to be queried; or when the VNF management entity verifies related information of any VNFC, determining, by the VNF management entity, that the VNFC is the VNFC that needs to be queried.

With reference to the second implementation manner of the third aspect, in a third implementation manner of the third aspect, the identity information of the VNFC that needs to be queried includes a functional entity identity of the VNFC, or identity information of a VNF to which the VNFC belongs, or a VNFC identity, or identity information of a VNF to which the VNFC belongs and a VNFC identity; the identity information of the VNF includes a functional entity identity of the VNF, or a VNF identity.

With reference to the third implementation manner of the third aspect, in a fourth implementation manner of the third aspect, the mapping relationship includes: a correspondence between a functional entity identity of each VNFC and the virtual machine identity; or a correspondence between identity information of a VNF to which each VNFC belongs and the virtual machine identity; or a correspondence between a VNFC identity of each VNFC and the virtual machine identity; or a correspondence between identity information of a VNF to which each VNFC belongs and a VNFC identity, and the virtual machine identity; or a correspondence between a functional entity identity of each VNFC and the virtual container identity; or a correspondence between identity information of a VNF to which each VNFC belongs and the virtual container identity; or a correspondence between a VNFC identity of each VNFC and the virtual container identity; or a correspondence between identity information of a VNF to which each VNFC belongs and a VNFC identity, and the virtual container identity.

With reference to the third aspect, or the first implementation manner of the third aspect, or the second implementation manner of the third aspect, or the third implementation manner of the third aspect, or the fourth implementation manner of the third aspect, in a fifth implementation manner of the third aspect, the VNF management entity includes a virtualized network function manager VNFM or a NFVO.

According to a fourth aspect, a method for querying a location of a hardware resource provided in an embodiment of the present invention includes: receiving, by a VIM, a VM query request sent by a VNF management entity, where the VM query request includes a virtual machine identity or virtual container identity of a virtual machine that needs to be queried; querying, by the VIM, hardware resource information of the virtual machine according to the VM query request; and sending, by the VIM, the found hardware resource information of the virtual machine to the VNF management entity, where the hardware resource information includes location information of the hardware resource.

With reference to the fourth aspect, in a first implementation manner of the fourth aspect, the location information of the hardware resource includes any one or any combination of the following: city information, equipment room information, cabinet information, a device identity, a port network identity, and a network interface identity.

According to a fifth aspect, an embodiment of the present invention provides a VIM, where the VIM is configured to manage a hardware resource, and the VIM includes: a receiving unit, configured to receive a hardware resource allocation request message sent by a VNF management entity, where the hardware resource allocation request message is used to request the VIM to allocate a hardware resource to a virtual machine that runs a VNFC, and the hardware resource allocation request message includes location information of the hardware resource that the virtual machine requests to allocate; and a processing unit, configured to allocate the hardware resource at a corresponding location to the virtual machine according to the location information of the hardware resource.

With reference to the fifth aspect, in a first implementation manner of the fifth aspect, the location information of the hardware resource includes any one or any combination of the following: city information, equipment room information, cabinet information, a device identity, a port network identity, and a network interface identity.

With reference to the fifth aspect or the first implementation manner of the fifth aspect, in a second implementation manner of the fifth aspect, the hardware resource allocation request message further includes an exclusive identity or a shared identity, the exclusive identity is used to identify that the hardware resource, at the specified location, that the virtual machine requests to allocate is exclusively occupied by the virtual machine, and the shared identity is used to identify that the hardware resource, at the specified location, that the virtual machine requests to allocate may be shared with another virtual machine.

With reference to the second implementation manner of the fifth aspect, in a third implementation manner of the fifth aspect, 1 is used to indicate the exclusive identity, and 0 is used to indicate the shared identity; or 0 is used to indicate the exclusive identity, and 1 is used to indicate the shared identity.

With reference to the fifth aspect, or the first implementation manner of the fifth aspect, or the second implementation manner of the fifth aspect, or the third implementation manner of the fifth aspect, in a fourth implementation manner of the fifth aspect, the receiving unit is further configured to receive a hardware resource adjustment request message sent by the VNF management entity, where the hardware resource adjustment request message includes location information and adjustment information that are of a hardware resource that the VNFC requests to adjust; and the processing unit is further configured to adjust the hardware resource at a corresponding location according to the hardware resource adjustment request message.

With reference to the fifth aspect, or the first implementation manner of the fifth aspect, or the second implementation manner of the fifth aspect, or the third implementation manner of the fifth aspect, or the fourth implementation manner of the fifth aspect, in a fifth implementation manner of the fifth aspect, the VNF management entity includes a virtualized network function manager VNFM or a NFVO.

According to a sixth aspect, an embodiment of the present invention provides a VNF management entity, where the VNF management entity is configured to manage a hardware resource, and the VNF management entity includes: a receiving unit, configured to acquire an instantiated VNF message, where the instantiated VNF message includes location information of a hardware resource that a virtual machine running a VNFC requests to allocate; and a sending unit, configured to send a hardware resource allocation request message to a VIM according to the instantiated VNF message, where the hardware resource allocation request message is used to request the VIM to allocate the hardware resource to the virtual machine, and the hardware resource allocation request message includes the location information of the hardware resource that the virtual machine requests to allocate.

With reference to the sixth aspect, in a first implementation manner of the sixth aspect, the location information of the hardware resource includes any one or any combination of the following: city information, equipment room information, cabinet information, a device identity, a port network identity, and a network interface identity.

With reference to the sixth aspect or the first implementation manner of the sixth aspect, in a second implementation manner of the sixth aspect, the VNF management entity includes a virtualized network function manager VNFM; and the receiving unit is specifically configured to receive the instantiated VNF message sent by an operator or element management (EM).

With reference to the sixth aspect or the first implementation manner of the sixth aspect, in a third implementation manner of the sixth aspect, the VNF management entity includes a NFVO; and the receiving unit is specifically configured to receive the instantiated VNF message sent by an operator or an OSS.

With reference to the sixth aspect, or the first implementation manner of the sixth aspect, or the second implementation manner of the sixth aspect, or the third implementation manner of the sixth aspect, in a fourth implementation manner of the sixth aspect, the sending unit is specifically configured to determine, according to the location information of the hardware resource, a VIM that manages the hardware resource, and send the hardware resource allocation request message to the VIM that manages the hardware resource.

With reference to the sixth aspect, or the first implementation manner of the sixth aspect, or the second implementation manner of the sixth aspect, or the third implementation manner of the sixth aspect, or the fourth implementation manner of the sixth aspect, in a fifth implementation manner of the sixth aspect, the receiving unit is further configured to receive a hardware resource adjustment request message sent by the VNFC, where the hardware resource adjustment request message includes location information and adjustment information that are of a hardware resource that the VNFC requests to adjust; and the sending unit is further configured to forward the hardware resource adjustment request message to the VIM, so as to request the VIM to adjust the hardware resource at a corresponding location.

According to a seventh aspect, an embodiment of the present invention provides a VNF management entity, where the VNF management entity is configured to query a location of a hardware resource, and the VNF management entity includes: a processing unit, configured to determine a VNFC that needs to be queried, and search for, according to a mapping relationship, a virtual machine that runs the VNFC that needs to be queried; a sending unit, configured to send a virtual machine (VM) query request to a VIM that manages the virtual machine, so as to request the VIM to query hardware resource information of the virtual machine, where the VM query request includes a virtual machine identity or virtual container identity of the virtual machine; and a receiving unit, configured to receive the hardware resource information that is of the virtual machine and returned by the VIM, where the hardware resource information includes location information of the hardware resource.

With reference to the seventh aspect, in a first implementation manner of the seventh aspect, the location information of the hardware resource includes any one or any combination of the following: city information, equipment room information, cabinet information, a device identity, a port network identity, and a network interface identity.

With reference to the seventh aspect or the first implementation manner of the seventh aspect, in a second implementation manner of the seventh aspect, the determining, by the processing unit, a VNFC that needs to be queried includes: determining, by the processing unit according to a query request sent by an external system, the VNFC that needs to be queried, where the query request includes identity information of the VNFC that needs to be queried; or when the VNF management entity verifies related information of any VNFC, determining, by the processing unit, that the VNFC is the VNFC that needs to be queried.

With reference to the second implementation manner of the seventh aspect, in a third implementation manner of the seventh aspect, the identity information of the VNFC that needs to be queried includes a functional entity identity of the VNFC, or identity information of a VNF to which the VNFC belongs, or a VNFC identity, or identity information of a VNF to which the VNFC belongs and a VNFC identity; the identity information of the VNF includes a functional entity identity of the VNF, or a VNF identity.

With reference to the third implementation manner of the seventh aspect, in a fourth implementation manner of the seventh aspect, the mapping relationship includes: a correspondence between a functional entity identity of each VNFC and the virtual machine identity; or a correspondence between identity information of a VNF to which each VNFC belongs and the virtual machine identity; or a correspondence between a VNFC identity of each VNFC and the virtual machine identity; or a correspondence between identity information of a VNF to which each VNFC belongs and a VNFC identity, and the virtual machine identity; or a correspondence between a functional entity identity of each VNFC and the virtual container identity; or a correspondence between identity information of a VNF to which each VNFC belongs and the virtual container identity; or a correspondence between a VNFC identity of each VNFC and the virtual container identity; or a correspondence between identity information of a VNF to which each VNFC belongs and a VNFC identity, and the virtual container identity.

With reference to the seventh aspect, or the first implementation manner of the seventh aspect, or the second implementation manner of the seventh aspect, or the third implementation manner of the seventh aspect, or the fourth implementation manner of the seventh aspect, in a fifth implementation manner of the seventh aspect, the VNF management entity includes a virtualized network function manager VNFM or a NFVO.

According to an eighth aspect, an embodiment of the present invention provides a VIM, where the VIM is configured to query a location of a hardware resource, and the VIM includes: a receiving unit, configured to receive a virtual machine (VM) query request sent by a VNF management entity, where the VM query request includes a virtual machine identity or virtual container identity of a virtual machine that needs to be queried; a querying unit, configured to query hardware resource information of the virtual machine according to the VM query request; and a sending unit, configured to send the found hardware resource information of the virtual machine to the VNF management entity, where the hardware resource information includes location information of the hardware resource.

With reference to the eighth aspect, in a first implementation manner of the eighth aspect, the location information of the hardware resource includes any one or any combination of the following: city information, equipment room information, cabinet information, a device identity, a port network identity, and a network interface identity.

It can be learned from the foregoing technical solutions that the embodiments of the present invention have the following advantages: In the embodiments of the present invention, when a virtual machine needs a hardware resource, a VIM receives a hardware resource allocation request message sent by a VNF management entity, where the hardware resource allocation request message includes location information of the hardware resource that the virtual machine requests to allocate; the VIM allocates the hardware resource at a corresponding location to the virtual machine according to the location information that is of the hardware resource and included in the hardware resource allocation request message. That is, in the embodiments of the present invention, location information of a hardware resource that a virtual machine running a service requests to allocate may be carried in a hardware resource allocation request message, and the VIM may allocate a hardware resource at a specified location to the virtual machine. Therefore, a requirement of a sensitive service can be met.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present embodiments.

The present embodiments provide a method for managing a hardware resource, a method for querying a location of a hardware resource, and a related apparatus, which can meet a requirement of a sensitive service.

Figure 1:
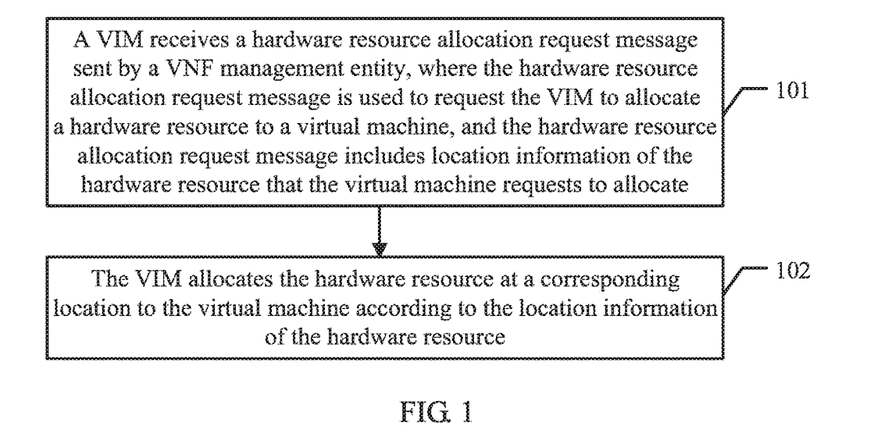
FIG. 1 is a schematic diagram of an embodiment of a method for managing a hardware resource according to the present invention.

Referring to FIG. 1, FIG. 1 is an embodiment of a method for managing a hardware resource according to the present embodiments, and the method in this embodiment includes:

101. A virtualized infrastructure manager (VIM) receives a hardware resource allocation request message sent by a virtualized network function (VNF) management entity, where the hardware resource allocation request message is used to request the VIM to allocate a hardware resource to a virtual machine, and the hardware resource allocation request message includes location information of the hardware resource that the virtual machine requests to allocate.

The virtual machine is a virtual machine that runs a virtualized network function component (VNFC). The hardware resource allocation request may further include information such as a quantity of central processing units (CPUs), and/or a memory size, and/or a hard disk capacity that the virtual machine requests to allocate.

102. The VIM allocates the hardware resource at a corresponding location to the virtual machine according to the location information of the hardware resource.

The virtualized infrastructure manager (VIM) may allocate a specified resource at a specified location to the virtual machine.

After the VIM completes hardware resource allocation according to a request of the virtual machine, the VIM may send a hardware resource allocation acknowledgment message to the VNF management entity, so as to acknowledge that the hardware resource at the specified location has been allocated to the virtual machine.

In this embodiment, a VNF management entity may carry, in a hardware resource allocation request message, location information of a hardware resource that a virtual machine running a service requests to allocate; a VIM receives the hardware resource allocation request message, and allocates the hardware resource at a specified location to the virtual machine according to the hardware resource allocation request message. In this way, for a sensitive service such as lawful interception, location information of a hardware resource related to the sensitive service may be clearly known; and according to the location information, sealing of a related physical device may be implemented, a confidentiality measure is taken to prohibit an unauthorized person from touching, operating, and destructing the related physical device, and the like, thereby meeting a requirement of the sensitive service.

Figure 2:
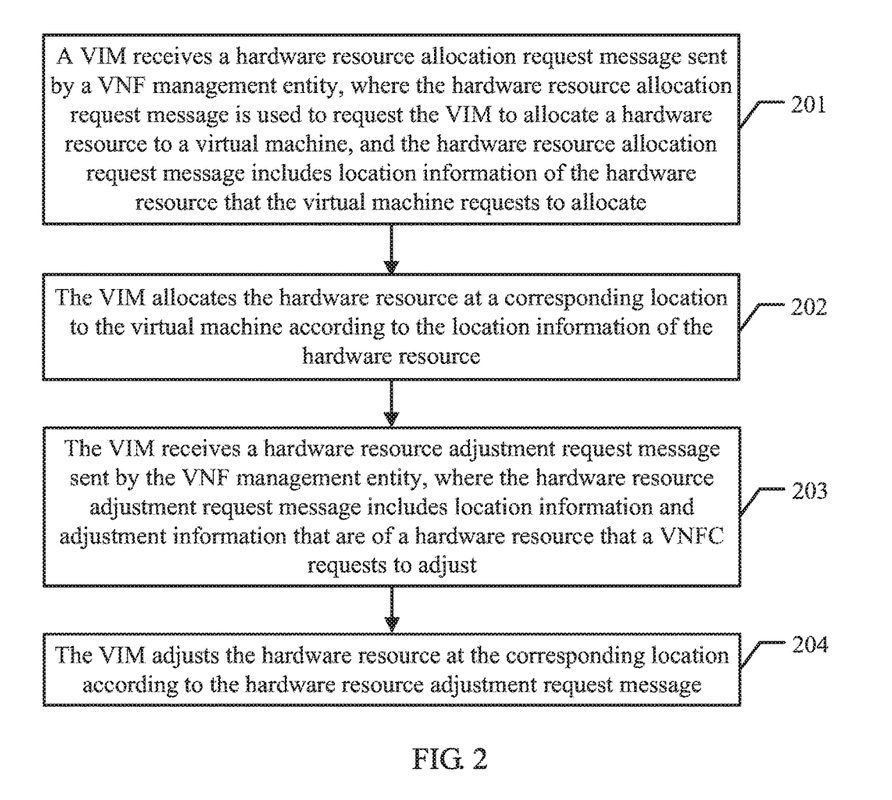
FIG. 2 is a schematic diagram of another embodiment of a method for managing a hardware resource according to the present invention.

For ease of understanding, the following describes a method for managing a hardware resource in the present embodiments by using a specific embodiment. Referring to FIG. 2, the method in this embodiment includes.

201. A VIM receives a hardware resource allocation request message sent by a VNF management entity, where the hardware resource allocation request message is used to request the VIM to allocate a hardware resource to a virtual machine, and the hardware resource allocation request message includes location information of the hardware resource that the virtual machine requests to allocate.

In specific implementation, the VNF management entity includes a virtualized network function manager (VNFM) or a network functions virtualization orchestrator (NFVO).

The virtual machine is a virtual machine that runs a VNFC. In addition to the location information of the hardware resource, the hardware resource allocation request message may further include information such as an exclusive identity or a shared identity, and/or a quantity of CPUs and/or a memory size and/or a hard disk capacity that the virtual machine requests to allocate.

The location information of the hardware resource may be any one or any combination of the following: city information, equipment room information, cabinet information, a device identity, a port network identity, and a network interface identity; 1 may be used to indicate the exclusive identity, and 0 may be used to indicate the shared identity; and vice versa. The exclusive identity is used to identify that the hardware resource, at the specified location, that the virtual machine requests to allocate is exclusively occupied by the virtual machine, and the shared identity is used to identify that the hardware resource, at the specified location, that the virtual machine requests to allocate may be shared with another virtual machine. When a service that runs on the virtual machine is a sensitive service, for security consideration, the hardware resource allocation request message had better carry the exclusive identity.

202. The VIM allocates the hardware resource at a corresponding location to the virtual machine according to the location information of the hardware resource.

In specific implementation, the location information of the hardware resource may be any one or any combination of the following: city information, equipment room information, cabinet information, a device identity, a port network identity, and a network interface identity. That the VIM allocates a hardware resource at a specified location to the virtual machine may include the following situations: First, only a specific location of the hardware resource is specified, for example, the location information is information about an equipment room, but resources are not specified, then all resources at the location may be allocated to the virtual machine, and all hardware at the location may be monitored subsequently; second, a specific hardware device is specified, for example, the location information is a device identity, but a location at which the hardware device is placed is not limited, and then wherever the hardware device is placed subsequently, the hardware device needs to be monitored; third, a location of the hardware resource and a specific hardware device are specified, and in this case, a specified device at a specified location may be monitored subsequently.

After the VIM completes hardware resource allocation according to the request of the virtual machine, the VIM may send a hardware resource allocation acknowledgment message to the VNF management entity, so as to acknowledge that the hardware resource at the specified location has been allocated to the virtual machine.

203. The VIM receives a hardware resource adjustment request message sent by the VNF management entity, where the hardware resource adjustment request message includes location information and adjustment information that are of a hardware resource that a VNFC requests to adjust.

In a running process, the VNFC may send the hardware resource adjustment request message to the VNF management entity according to usage of a hardware resource of the VNFC; the VNF management entity forwards the hardware resource adjustment request message to the VIM, so as to request the VIM to adjust the hardware resource at a corresponding location, where adjustment information included in the hardware resource adjustment request message may be information such as memory or disk expansion and CPU or memory reduction.

204. The VIM adjusts the hardware resource at the corresponding location according to the hardware resource adjustment request message.

According to the hardware resource adjustment request message, the VIM may expand a memory or disk at a specified location, and reduce a CPU or memory at a specified location.

After the VIM completes hardware resource adjustment according to a request of the VNFC, the VIM may send a hardware resource adjustment acknowledgment message to the VNF management entity, so as to acknowledge that the hardware resource at the specified location has been adjusted for the VNFC.

In this embodiment, a VNF management entity may carry, in a hardware resource allocation request message, location information of a hardware resource that a virtual machine running a service requests to allocate; a VIM receives the hardware resource allocation request message, and allocates the hardware resource at a specified location to the virtual machine according to the hardware resource allocation request message. In this way, for a sensitive service such as lawful interception, location information of a hardware resource related to the sensitive service may be clearly known; and according to the location information, sealing of a related physical device may be implemented, a confidentiality measure is taken to prohibit an unauthorized person from touching, operating, and destructing the related physi-cal device, and so on, thereby meeting a requirement of the sensitive service. In addition, the VIM in this embodiment may further adjust a hardware resource at a corresponding location according to a hardware resource adjustment request message sent by the VNF management entity, so as to further meet requirements of different services.

The foregoing two embodiments describe, from a perspective of a VIM, the methods for managing a hardware resource provided in the present embodiments; the following two embodiments describe, from a perspective of a VNF management entity, methods for managing a hardware resource provided in the present embodiments.

Figure 3:
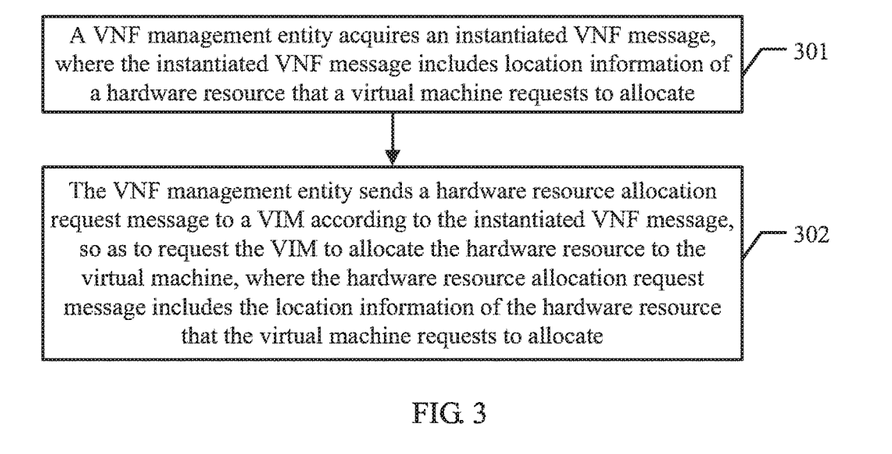
FIG. 3 is a schematic diagram of another embodiment of a method for managing a hardware resource according to the present invention.

Referring to FIG. 3, a method for managing a hardware resource in an embodiment includes.

301. A VNF management entity acquires an instantiated VNF message, where the instantiated VNF message includes location information of a hardware resource that a virtual machine requests to allocate.

The virtual machine is a virtual machine that runs a VNFC. The instantiated VNF message may further include information such as a quantity of CPUs, and/or a memory size, and/or a hard disk capacity that the virtual machine requests to allocate.

302. The VNF management entity sends a hardware resource allocation request message to a VIM according to the instantiated VNF message, so as to request the VIM to allocate the hardware resource to the virtual machine, where the hardware resource allocation request message includes the location information of the hardware resource that the virtual machine requests to allocate.

The hardware resource allocation request message may further include information such as a quantity of CPUs, and/or a memory size, and/or a hard disk capacity that the virtual machine requests to allocate.

After the VNF management entity sends a hardware resource allocation request to the VIM, the VNF management entity may receive a hardware resource allocation acknowledgment message sent by the VIM, which acknowledges that a hardware resource at a specified location has been allocated to the VM. In this embodiment, after acquiring an instantiated VNF message, a VNF management entity may carry, in a hardware resource allocation request message, location information that is of a hardware resource that a virtual machine running a service requests to allocate and included in the instantiated VNF message, so as to request a VIM to allocate the hardware resource at a specified location to the virtual machine according to the hardware resource allocation request message. In this way, for a sensitive service such as lawful interception, location information of a hardware resource related to the sensitive service may be clearly known; and according to the location information, sealing of a related physical device may be implemented, a confidentiality measure is taken to prohibit an unauthorized person from touching, operating, and destructing the related physical device, and so on, thereby meeting a requirement of the sensitive service.

Figure 4:
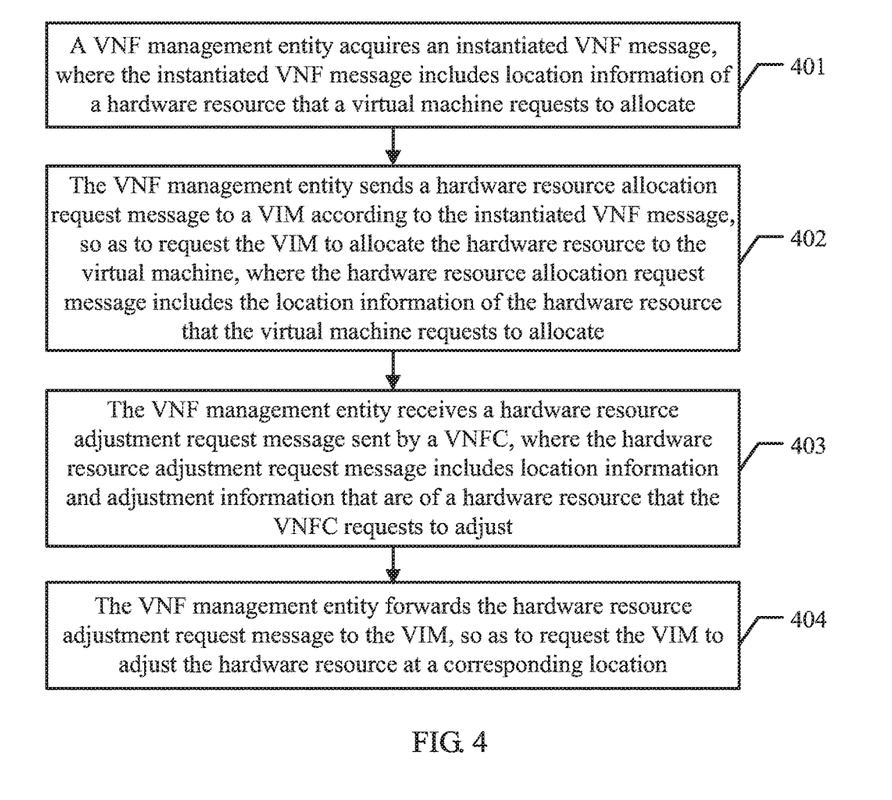
FIG. 4 is a schematic diagram of another embodiment of a method for managing a hardware resource according to the present invention.

Referring to FIG. 4, FIG. 4 is a specific embodiment of a method for managing a hardware resource according to the present embodiments; the method in this embodiment includes.

401. A VNF management entity acquires an instantiated VNF message, where the instantiated VNF message includes location information of a hardware resource that a virtual machine requests to allocate.

In specific implementation, the VNF management entity includes a virtualized network function manager VNFM or a NFVO. When the VNF management entity includes the VNFM, that the VNF management entity acquires the instantiated VNF message is specifically receiving, by the VNFM, the instantiated VNF message sent by an operator or element management (EM). When the VNF management entity includes the NFVO, that the VNF management entity acquires the instantiated VNF message is specifically receiving, by the NFVO, the instantiated VNF message sent by an operator or an operation support system (OSS) (Operation Support System, OSS).

The virtual machine includes a virtual machine that runs a VNFC. In addition to the location information of the hardware resource, the instantiated VNF message may further include information such as an exclusive identity or a shared identity, and/or a quantity of CPUs and/or a memory size and/or a hard disk capacity that the virtual machine requests to allocate.

The location information of the hardware resource may be any one or any combination of the following: city information, equipment room information, cabinet information, a device identity, a port network identity, and a network interface identity; 1 may be used to indicate the exclusive identity, and 0 may be used to indicate the shared identity; and vice versa. The exclusive identity is used to identify that the hardware resource, at a specified location, that the virtual machine requests to allocate is exclusively occupied by the virtual machine, and the shared identity is used to identify that the hardware resource, at the specified location, that the virtual machine requests to allocate may be shared with another virtual machine. When a service that runs on the virtual machine is a sensitive service, for security consideration, the instantiated VNF message had better carry the exclusive identity.

402. The VNF management entity sends a hardware resource allocation request message to a VIM according to the instantiated VNF message, so as to request the VIM to allocate the hardware resource to the virtual machine, where the hardware resource allocation request message includes the location information of the hardware resource that the virtual machine requests to allocate.

In specific implementation, the VNF management entity first determines, according to the location information that is of the hardware resource and included in the instantiated VNF message, a VIM that manages the hardware resource, and then sends the hardware resource allocation request message to the VIM that manages the hardware resource. The hardware resource request message may further include other information included in the instantiated VNF message.

In specific implementation, the location information of the hardware resource may be any one or any combination of the following: city information, equipment room information, cabinet information, a device identity, a port network identity, and a network interface identity. That the VNF management entity requests the VIM to allocate a hardware resource at a specified location to the virtual machine may include the following situations: First, only a specific location of the hardware resource is specified, for example, the location information is information about an equipment room, but resources are not specified, then all resources at the location may be allocated to the virtual machine, and all hardware at the location may be monitored subsequently; second, a specific hardware device is specified, for example, the location information is a device identity, but a location at which the hardware device is placed is not limited, and then wherever the hardware device is placed subsequently, the hardware device needs to be monitored; third, a location of the hardware resource and a specific hardware device are specified, and in this case, a specified device at a specified location may be monitored subsequently.

After the VIM completes hardware resource allocation according to a request of the virtual machine, the VIM may send a hardware resource allocation acknowledgment message to the VNF management entity, so as to acknowledge that the hardware resource at the specified location has been allocated to the virtual machine; the VNF management entity receives the hardware resource allocation acknowledgment message.

403. The VNF management entity receives a hardware resource adjustment request message sent by a VNFC, where the hardware resource adjustment request message includes location information and adjustment information that are of a hardware resource that the VNFC requests to adjust.

In a running process, the VNFC may send the hardware resource adjustment request message to the VNF management entity according to usage of a hardware resource of the VNFC; the VNF management entity receives the hardware resource adjustment request message, where adjustment information included in the hardware resource adjustment request message may be information such as memory or disk expansion and CPU or memory reduction.

404. The VNF management entity forwards the hardware resource adjustment request message to the VIM, so as to request the VIM to adjust the hardware resource at a corresponding location.

The VNF management entity may request the VIM to expand a memory or disk at a specified location, and reduce a CPU or memory at a specified location.

After forwarding the hardware resource adjustment request message to the VIM, the VNF management entity may receive a hardware resource adjustment acknowledgment message sent by the VIM, which acknowledges that adjustment of the location of the hardware resource is successful.

In this embodiment, after acquiring an instantiated VNF message, a VNF management entity may carry, in a hardware resource allocation request message, location information that is of a hardware resource that a virtual machine running a service requests to allocate and included in the instantiated VNF message, and send the hardware resource allocation request message to a VIM, so as to request the VIM to allocate a hardware resource at a specified location to the virtual machine according to the hardware resource allocation request message. In this way, for a sensitive service such as lawful interception, location information of a hardware resource related to the sensitive service may be clearly known; and according to the location information, sealing of a related physical device may be implemented, a confidentiality measure is taken to prohibit an unauthorized person from touching, operating, and destructing the related physical device, and so on, thereby meeting a requirement of the sensitive service. In addition, the VNF management entity in this embodiment may further forward, to the VIM, a hardware resource adjustment request message sent by a VNF or a VNFC, so as to request the VIM to adjust a hardware resource at a corresponding location, thereby further meeting requirements of different services.

Figure 5:
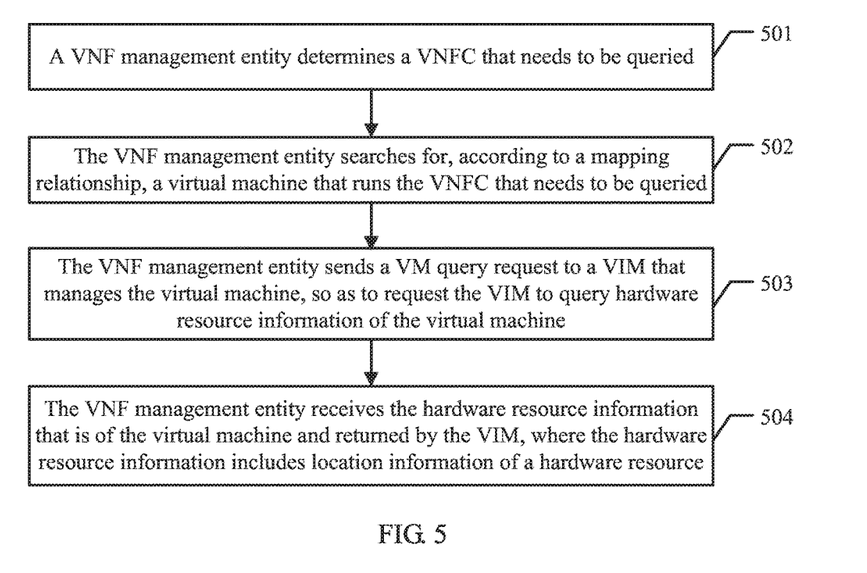
FIG. 5 is a schematic diagram of an embodiment of a method for querying a location of a hardware resource according to the present invention.

The following introduces a method for querying a location of a hardware resource provided in the present embodiments; referring to FIG. 5, the method in this embodiment includes.

501. A VNF management entity determines a VNFC that needs to be queried.

In specific implementation, the VNF management entity may determine, according to a query request sent by an external system, the VNFC that needs to be queried, where the query request includes identity information of the VNFC that needs to be queried. The external system may be a management system of a sensitive service.

The identity information of the VNFC that needs to be queried includes a functional entity identity of the VNFC (the functional entity identity is information that is used to identify a VNFC and agreed by the VNF management entity and the external system, for example, an IP address of a VNFC functional entity) (VNFC entity id), or identity information of a VNF to which the VNFC belongs (when the VNF has only one VNFC, the identity information of the VNF to which the VNFC belongs may be used to identify the VNFC) (the identity information of the VNF includes a functional entity identity VNF entity id of the VNF or a VNF identity VNF id), or a VNFC identity (VNFC id), or a combination of identity information of a VNF to which the VNFC belongs and a VNFC identity (VNF id+VNFC id or VNF entity id+VNFC id).

In addition, when the VNF management entity needs to verify related information of any VNFC, for example, to verify whether a location of a hardware resource of a VNFC is valid, the VNF management entity determines that the VNFC is the VNFC that needs to be queried.

502. The VNF management entity searches for, according to a mapping relationship, a virtual machine that runs the VNFC that needs to be queried.

The mapping relationship includes: a correspondence between a functional entity identity of each VNFC and the virtual machine identity (VNFC entity id<=>VM id); or a correspondence between identity information of a VNF to which each VNFC belongs and the virtual machine identity (VNF id<=>VM id or VNF entity id<=>VM id); or a correspondence between a VNFC identity of each VNFC and the virtual machine identity (VNFC id<=>VM id); or a correspondence between a combination of identity information of a VNF to which each VNFC belongs and a VNFC identity, and the virtual machine identity (VNF id+VNFC id<=>VM id or VNF entity id+VNFC id<=>VM id); or a correspondence between a functional entity identity of each VNFC and the virtual container identity (VNFC entity id<=>VC id); or a correspondence between identity information of a VNF to which each VNFC belongs and the virtual container identity (VNF id<=>VC id or VNF entity id<=>VC id); or a correspondence between a VNFC identity of each VNFC and the virtual container identity (VNFC id<=>VC id); or a correspondence between a combination of identity information of a VNF to which each VNFC belongs and a VNFC identity, and the virtual container identity (VNF id+VNFC id<=>VC id or VNF entity id+VNFC id<=>VC id). The mapping relationship may be dynamically maintained and updated in real time.

503. The VNF management entity sends a VM query request to a VIM that manages the virtual machine, so as to request the VIM to query hardware resource information of the virtual machine.

The VM query request includes a virtual machine identity (VM id) or virtual container identity (VC id) of the virtual machine.

504. The VNF management entity receives the hardware resource information that is of the virtual machine and returned by the VIM, where the hardware resource information includes location information of a hardware resource.

The location information of the hardware resource includes any one or any combination of the following: city information, equipment room information, cabinet information, a device identity, a port network identity, and a network interface identity. In addition, the hardware resource information that is of the virtual machine and returned by the VIM may further include information such as a quantity of CPUs and/or a memory size that are/is allocated to the virtual machine.

In specific implementation, the foregoing VNF management entity includes a virtualized network function manager VNFM or a NFVO.

In this embodiment, a VNF management entity may search for, according to a mapping relationship, a virtual machine that runs a VNF that needs to be queried or a virtual machine that runs a VNFC, and then send a VM query request to a VIM, so as to request the VIM to query hardware resource information of the virtual machine, where the hardware resource information includes location information of a hardware resource. In this way, for a sensitive service such as lawful interception, location information of a hardware resource related to the sensitive service may be clearly known; and according to the location information, sealing of a related physical device may be implemented, a confidentiality measure is taken to prohibit an unauthorized person from touching, operating, and destructing the related physical device, and so on, thereby meeting a requirement of the sensitive service.

The foregoing embodiment describes, from a perspective of a VNF management entity, the method for querying a location of a hardware resource provided in the present embodiments; the following embodiment describes, from a perspective of a VIM, a method for querying a location of a hardware resource provided in the present embodiments.

Figure 6:
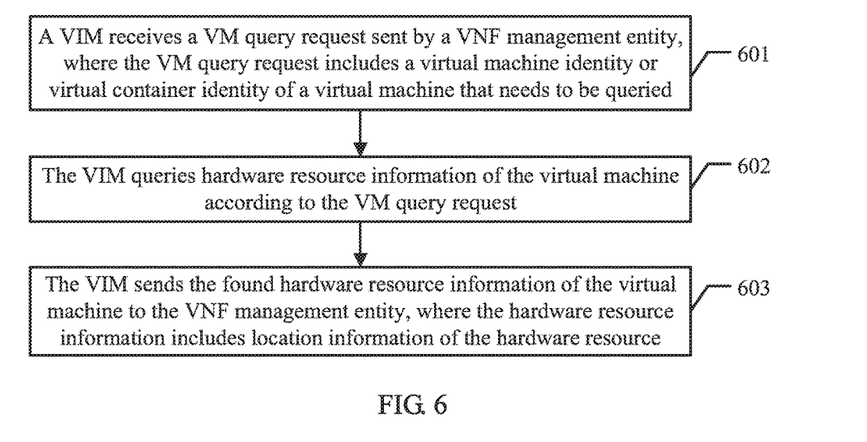
FIG. 6 is a schematic diagram of another embodiment of a method for querying a location of a hardware resource according to the present invention.

Referring to FIG. 6, the method for querying a location of a hardware resource in this embodiment includes.

601. A VIM receives a virtual machine (VM) query request sent by a VNF management entity, where the VM query request includes a virtual machine identity or virtual container identity of a virtual machine that needs to be queried.

602. The VIM queries hardware resource information of the virtual machine according to the VM query request.

603. The VIM sends the found hardware resource information of the virtual machine to the VNF management entity, where the hardware resource information includes location information of the hardware resource.

The location information of the hardware resource includes any one or any combination of the following: city information, equipment room information, cabinet information, a device identity, a port network identity, and a network interface identity.

The hardware resource information that is of the virtual machine and found by the VIM may further include information such as a quantity of CPUs and/or a memory size that are/is allocated to the virtual machine.

In this embodiment, after receiving a VM query request sent by a VNF management entity, a VIM may query hardware resource information of a virtual machine that runs a VNF or VNFC that needs to be queried, and then return found hardware resource information to the VNF management entity, where the hardware resource information includes location information of a hardware resource. In this way, for a sensitive service such as lawful interception, location information of a hardware resource related to the sensitive service may be clearly known; and according to the location information, sealing of a related physical device may be implemented, a confidentiality measure is taken to prohibit an unauthorized person from touching, operating, and destructing the related physical device, and so on, thereby meeting a requirement of the sensitive service.

Figure 7:
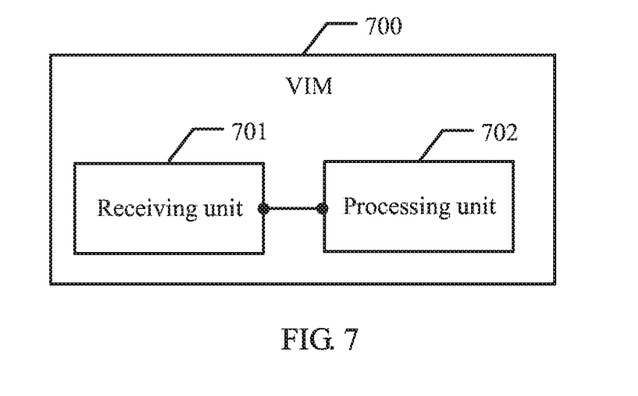
FIG. 7 is a schematic diagram of an embodiment of a virtualized infrastructure manager (VIM) according to the present invention.

The following introduces a virtualized infrastructure manager (VIM) of the present embodiments. Referring to FIG. 7, a VIM 700 in an embodiment is configured to manage a hardware resource, and the VIM 700 in this embodiment includes: a receiving unit 701, configured to receive a hardware resource allocation request message sent by a VNF management entity, where the hardware resource allocation request message is used to request the VIM to allocate a hardware resource to a virtual machine that runs a virtualized network function component (VNFC), and the hardware resource allocation request message includes location information of the hardware resource that the virtual machine requests to allocate; and a processing unit 702, configured to allocate the hardware resource at a corresponding location to the virtual machine according to the location information of the hardware resource.

In specific implementation, the VNF management entity includes a VNFM or an NFVO.

When a virtual machine that runs a VNFC requests allocation of a hardware resource, the receiving unit 701 receives a hardware resource allocation request sent by the VNF management entity. In addition to location information of the hardware resource, the hardware resource allocation request message may further include information such as an exclusive identity or a shared identity, and/or a quantity of CPUs and/or a memory size and/or a hard disk capacity that the virtual machine requests to allocate.

The location information of the hardware resource may be any one or any combination of the following: city information, equipment room information, cabinet information, a device identity, a port network identity, and a network interface identity; 1 may be used to indicate the exclusive identity, and 0 may be used to indicate the shared identity; and vice versa. The exclusive identity is used to identify that the hardware resource, at the specified location, that the virtual machine requests to allocate is exclusively occupied by the virtual machine, and the shared identity is used to identify that the hardware resource, at the specified location, that the virtual machine requests to allocate may be shared with another virtual machine. When a service that runs on the virtual machine is a sensitive service, for security consideration, the hardware resource allocation request message had better carry the exclusive identity. The processing unit 702 may allocate a specified resource at a specified location to the virtual machine according to the hardware resource allocation request message received by the receiving unit 701.

In a running process, the VNFC may send a hardware resource adjustment request message to the VNF management entity according to usage of a hardware resource of the VNFC; the VNF management entity forwards the hardware resource adjustment request message to the VIM, so as to request the VIM to adjust the hardware resource at a corresponding location; the receiving unit 701 receives the hardware resource adjustment request message, where the hardware resource adjustment request message includes location information and adjustment information that are of a hardware resource that the VNFC requests to adjust, and the adjustment information includes information such as memory or disk expansion and CPU or memory reduction.

According to the hardware resource adjustment request message received by the receiving unit 701, the processing unit 702 may expand a memory or disk at a specified location, and reduce a CPU or memory at a specified location.

In this embodiment, a VNF management entity may carry, in a hardware resource allocation request message, location information of a hardware resource that a virtual machine running a service requests to allocate; a receiving unit receives the hardware resource allocation request message; a processing unit allocates a hardware resource at a specified location to the virtual machine according to the hardware resource allocation request message. In this way, for a sensitive service such as lawful interception, location information of a hardware resource related to the sensitive service may be clearly known; and according to the location information, sealing of a related physical device may be implemented, a confidentiality measure is taken to prohibit an unauthorized person from touching, operating, and destructing the related physical device, and so on, thereby meeting a requirement of the sensitive service. In addition, the VIM in this embodiment may further adjust a hardware resource at a corresponding location according to a hardware resource adjustment request message sent by the VNF management entity, so as to further meet requirements of different services.

In a specific embodiment, the VIM that is configured to manage a hardware resource may include a transceiver and a processor, where: the transceiver is configured to receive a hardware resource allocation request message sent by a VNF management entity, where the hardware resource allocation request message is used to request the VIM to allocate a hardware resource to a virtual machine that runs a VNFC, and the hardware resource allocation request message includes location information of the hardware resource that the virtual machine requests to allocate; and the processor is configured to allocate the hardware resource at a corresponding location to the virtual machine according to the location information of the hardware resource received by the transceiver.

It should be noted that the VIM in this embodiment may further be configured to implement other functions that can be implemented by the foregoing VIM that is configured to manage a hardware resource, and details are not described herein again.

Figure 8:
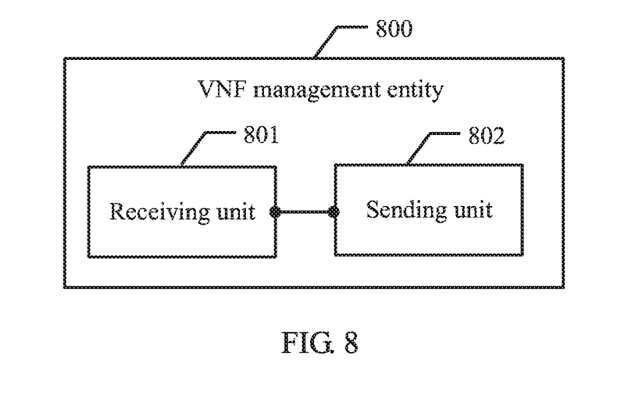
FIG. 8 is a schematic diagram of an embodiment of a virtualized network function (VNF) management entity according to the present invention.

The following introduces a VNF management entity of the present embodiments. Referring to FIG. 8, a VNF management entity 800 in an embodiment is configured to manage a hardware resource, and the VNF management entity 800 in this embodiment includes: a receiving unit 801, configured to acquire an instantiated VNF message, where the instantiated VNF message includes location information of a hardware resource that a virtual machine running a VNFC requests to allocate; and a sending unit 802, configured to send a hardware resource allocation request message to a VIM according to the instantiated VNF message, where the hardware resource allocation request message is used to request the VIM to allocate the hardware resource to the virtual machine, and the hardware resource allocation request message includes the location information of the hardware resource that the virtual machine requests to allocate.

In specific implementation, the VNF management entity includes a virtualized network function manager VNFM or a network functions virtualization orchestrator (NFVO). When the VNF management entity includes the VNFM, the receiving unit 801 receives an instantiated VNF message sent by an operator or element management (Element Management, EM). When the VNF management entity includes the NFVO, the receiving unit 801 receives an instantiated VNF message sent by an operator or an operation support system (OSS).

The virtual machine is a virtual machine that runs a VNFC. In addition to the location information of the hardware resource, the instantiated VNF message may further include information such as an exclusive identity or a shared identity, and/or a quantity of CPUs and/or a memory size and/or a hard disk capacity that the virtual machine requests to allocate.

The location information of the hardware resource may be any one or any combination of the following: city information, equipment room information, cabinet information, a device identity, a port network identity, and a network interface identity; 1 may be used to indicate the exclusive identity, and 0 may be used to indicate the shared identity; and vice versa. The exclusive identity is used to identify that the hardware resource, at a specified location, that the virtual machine requests to allocate is exclusively occupied by the virtual machine, and the shared identity is used to identify that the hardware resource, at the specified location, that the virtual machine requests to allocate may be shared with another virtual machine. When a service that runs on the virtual machine is a sensitive service, for security consideration, the instantiated VNF message had better carry the exclusive identity.

The sending unit 802 sends a hardware resource allocation request message to a VIM according to the instantiated VNF message received by the receiving unit 801, so as to request the VIM to allocate the hardware resource to the virtual machine, where the hardware resource allocation request message includes the location information of the hardware resource that the virtual machine requests to allocate.

In specific implementation, the sending unit 802 may first determine, according to the location information that is of the hardware resource and included in the instantiated VNF message, a VIM that manages the hardware resource, and then send the hardware resource allocation request message to the VIM that manages the hardware resource. The hardware resource request message may further include other information included in the instantiated VNF message.

In a running process, the VNFC may send a hardware resource adjustment request message to the VNF management entity according to usage of a hardware resource of the VNFC; the receiving unit 801 receives the hardware resource adjustment request message, where the hardware resource adjustment request message includes location information and adjustment information that are of a hardware resource that the VNFC requests to adjust, and adjustment information included in the hardware resource adjustment request message may be information such as memory or disk expansion and CPU or memory reduction.

The sending unit 802 forwards the hardware resource adjustment request message received by the receiving unit 801 to the VIM, so as to request the VIM to adjust the hardware resource at a corresponding location; according to the hardware resource adjustment request message, the VIM may expand a memory or disk at a specified location, and reduce a CPU or memory at a specified location.

In this embodiment, after a receiving unit acquires an instantiated VNF message, a sending unit may carry, in a hardware resource allocation request message, location information that is of a hardware resource that a virtual machine running a service requests to allocate and included in the instantiated VNF message, and send the hardware resource allocation request message to a VIM, so as to request the VIM to allocate a hardware resource at a specified location to the virtual machine according to the hardware resource allocation request message. In this way, for a sensitive service such as lawful interception, location information of a hardware resource related to the sensitive service may be clearly known; and according to the location information, sealing of a related physical device may be implemented, a confidentiality measure is taken to prohibit an unauthorized person from touching, operating, and destructing the related physical device, and so on, thereby meeting a requirement of the sensitive service. In addition, the sending unit may further forward, to the VIM, a hardware resource adjustment request message that is sent by a VNF or a VNFC and received by the receiving unit, so as to request the VIM to adjust a hardware resource at a corresponding location, thereby further meeting requirements of different services.

In a specific embodiment, the VNF management entity that is configured to manage a hardware resource may include a receiver and a transmitter, where: the receiver is configured to acquire an instantiated VNF message, where the instantiated VNF message includes location information of a hardware resource that a virtual machine running a VNFC requests to allocate; and the transmitter is configured to send a hardware resource allocation request message to a VIM according to the instantiated VNF message, where the hardware resource allocation request message is used to request the VIM to allocate the hardware resource to the virtual machine, and the hardware resource allocation request message includes the location information of the hardware resource that the virtual machine requests to allocate.

It should be noted that the VNF management entity in this embodiment may further be configured to implement other functions that can be implemented by the foregoing VNF management entity that is configured to manage a hardware resource, and details are not described herein again.

Figure 9:
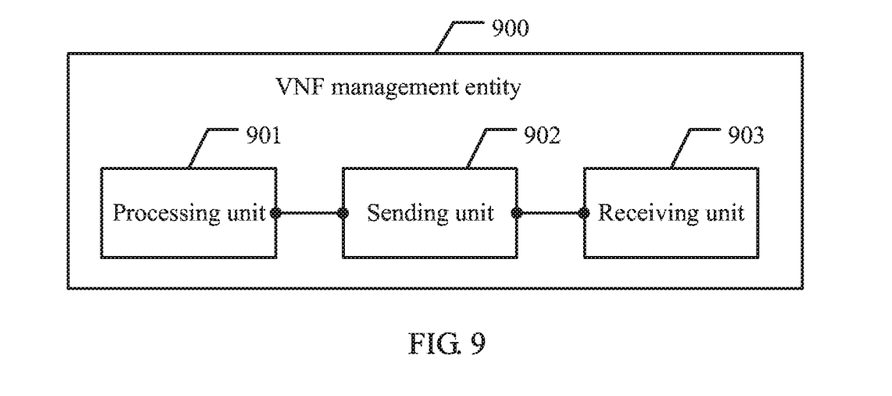
FIG. 9 is a schematic diagram of another embodiment of a VNF management entity according to the present invention.

Referring to FIG. 9, a VNF management entity 900 in an embodiment is configured to implement a method for querying a location of a hardware resource provided in the present embodiments, and the management entity 900 in this embodiment includes: a processing unit 901, configured to determine a virtualized network function (VNF) or VNFC that needs to be queried, and searches for a virtual machine according to a mapping relationship, where the virtual machine includes a virtual machine that runs the VNFC that needs to be queried; a sending unit 902, configured to send a VM query request to a VIM that manages the virtual machine, so as to request the VIM to query hardware resource information of the virtual machine, where the VM query request includes a virtual machine identity or virtual container identity of the virtual machine; and a receiving unit 903, configured to receive the hardware resource information that is of the virtual machine and returned by the VIM, where the hardware resource information includes location information of the hardware resource.

In specific implementation, the processing unit 901 may determine, according to a query request sent by an external system, the VNFC that needs to be queried, where the query request includes identity information of the VNFC that needs to be queried. The external system may be a management system of a sensitive service.

The identity information of the VNFC that needs to be queried includes a functional entity identity of the VNFC (the functional entity identity is information that is used to identify a VNFC and agreed by the VNF management entity and the external system, for example, an internet protocol (IP) address of a VNFC functional entity) (VNFC entity id), or identity information of a VNF to which the VNFC belongs (when the VNF has only one VNFC, the identity information of the VNF to which the VNFC belongs may be used to identify the VNFC) (the identity information of the VNF includes a functional entity identity VNF entity id of the VNF or a VNF identity VNF id), or a VNFC identity (VNFC id), or a combination of identity information of a VNF to which the VNFC belongs and a VNFC identity (VNF id+VNFC id or VNF entity id+VNFC id).

In addition, when the VNF management entity needs to verify related information of any VNFC, for example, to verify whether a location of a hardware resource of a VNFC is valid, the processing unit 901 determines that the VNFC is the VNFC that needs to be queried. The processing unit 901 searches for the virtual machine according to the mapping relationship, and the virtual machine includes a virtual machine that runs the VNFC that needs to be queried and is determined by the processing unit 901.

The mapping relationship includes: a correspondence between a functional entity identity of each VNFC and the virtual machine identity (VNFC entity id<=>VM id); or a correspondence between identity information of a VNF to which each VNFC belongs and the virtual machine identity (VNF id<=>VM id or VNF entity id<=>VM id); or a correspondence between a VNFC identity of each VNFC and the virtual machine identity (VNFC id<=>VM id); or a correspondence between a combination of identity information of a VNF to which each VNFC belongs and a VNFC identity, and the virtual machine identity (VNF id+VNFC id<=>VM id or VNF entity id+VNFC id<=>VM id); or a correspondence between a functional entity identity of each VNFC and the virtual container identity (VNFC entity id<=>VC id); or a correspondence between identity information of a VNF to which each VNFC belongs and the virtual container identity (VNF id<=>VC id or VNF entity id<=>VC id); or a correspondence between a VNFC identity of each VNFC and the virtual container identity (VNFC id<=>VC id); or a correspondence between a combination of identity information of a VNF to which each VNFC belongs and a VNFC identity, and the virtual container identity (VNF id+VNFC id<=>VC id or VNF entity id+VNFC id<=>VC id). The mapping relationship may be dynamically maintained and updated in real time.

The sending unit 902 sends, according to a search result of the processing unit 901, a VM query request to a VIM that manages the virtual machine, so as to request the VIM to query hardware resource information of the virtual machine. The VM query request includes a virtual machine identity (VM id) or virtual container identity (VC id) of the virtual machine.

The receiving unit 903 receives the hardware resource information that is of the virtual machine and returned by the VIM, where the hardware resource information includes location information of the hardware resource.

The location information of the hardware resource includes any one or any combination of the following: city information, equipment room information, cabinet information, a device identity, a port network identity, and a network interface identity. In addition, the hardware resource information that is of the virtual machine and returned by the VIM may further include information such as a quantity of CPUs and/or a memory size that are/is allocated to the virtual machine.

In specific implementation, the foregoing VNF management entity includes a virtualized network function manager VNFM or a NFVO.

In this embodiment, a processing unit may search for, according to a mapping relationship, a virtual machine that runs a VNF that needs to be queried or a virtual machine that runs a VNFC; then a sending unit sends a VM query request to a VIM, so as to request the VIM to query hardware resource information of the virtual machine; a receiving unit receives the hardware resource information of the virtual machine, where the hardware resource information includes location information of a hardware resource. In this way, for a sensitive service such as lawful interception, location information of a hardware resource related to the sensitive service may be clearly known; and according to the location information, sealing of a related physical device may be implemented, a confidentiality measure is taken to prohibit an unauthorized person from touching, operating, and destructing the related physical device, and so on, thereby meeting a requirement of the sensitive service.

In a specific embodiment, the VNF management entity that is configured to query a location of a hardware resource may include a processor and a transceiver, where: the processor is configured to determine a VNFC that needs to be queried, and search for, according to a mapping relationship, a virtual machine that runs the VNFC that needs to be queried; and the transceiver is configured to: send a VM query request to a VIM that manages the virtual machine, so as to request the VIM to query hardware resource information of the virtual machine, where the VM query request includes a virtual machine identity or virtual container identity of the virtual machine; and receive the hardware resource information that is of the virtual machine and returned by the VIM, where the hardware resource information includes location information of the hardware resource.

It should be noted that the VNF management entity in this embodiment may further be configured to implement other functions that can be implemented by the foregoing VNF management entity that is configured to query a location of a hardware resource, and details are not described herein again.

Figure 10:
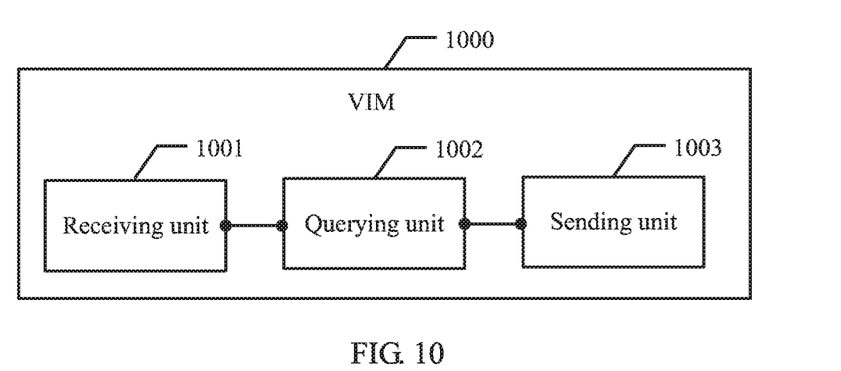
FIG. 10 is a schematic diagram of another embodiment of a VIM according to the present invention.

Referring to FIG. 10, a VIM in an embodiment is configured to implement a method for querying a location of a hardware resource provided in the present embodiments, and a VIM 1000 in this embodiment includes: a receiving unit 1001, configured to receive a VM query request sent by a VNF management entity, where the VM query request includes a virtual machine identity or virtual container identity of a virtual machine that needs to be queried; a querying unit 1002, configured to query hardware resource information of the virtual machine according to the VM query request; and a sending unit 1003, configured to send the found hardware resource information of the virtual machine to the VNF management entity, where the hardware resource information includes location information of the hardware resource.

In specific implementation, the location information of the hardware resource includes any one or any combination of the following: city information, equipment room information, cabinet information, a device identity, a port network identity, and a network interface identity.

The hardware resource information that is of the virtual machine and found by the VIM may further include information such as a quantity of CPUs and/or a memory size that are/is allocated to the virtual machine.

In this embodiment, after a receiving unit receives a VM query request sent by a VNF management entity, a querying unit may query hardware resource information of a virtual machine that runs a VNF or VNFC that needs to be queried, and then a sending unit returns found hardware resource information to the VNF management entity, where the hardware resource information includes location information of a hardware resource. In this way, for a sensitive service such as lawful interception, location information of a hardware resource related to the sensitive service may be clearly known; and according to the location information, sealing of a related physical device may be implemented, a confidentiality measure is taken to prohibit an unauthorized person from touching, operating, and destructing the related physical device, and so on, thereby meeting a requirement of the sensitive service.

In a specific embodiment, the VIM that is configured to query a location of a hardware resource may include a transceiver and a processor, where: the transceiver is configured to receive a VM query request sent by a VNF management entity, where the VM query request includes a virtual machine identity or virtual container identity of a virtual machine that needs to be queried; the processor is configured to query hardware resource information of the virtual machine according to the VM query request; and the transceiver is further configured to send the found hardware resource information of the virtual machine to the VNF management entity, where the hardware resource information includes location information of the hardware resource.

It should be noted that the VIM in this embodiment may further be configured to implement other functions that can be implemented by the foregoing VIM that is configured to query a location of a hardware resource, and details are not described herein again.

In addition, the described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. In addition, in the accompanying drawings of the apparatus embodiments provided by the present embodiments, connection relationships between modules indicate that the modules have communication connections with each other, which may be specifically implemented as one or more communications buses or signal cables. A person of ordinary skill in the art may understand and implement the embodiments of the present invention without creative efforts.

Based on the foregoing descriptions of the embodiments, a person skilled in the art may clearly understand that the present embodiments may be implemented by software in addition to necessary universal hardware or by dedicated hardware only, including a dedicated integrated circuit, a dedicated CPU, a dedicated memory, a dedicated component and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present embodiments, software program implementation is a better implementation manner in most cases. Based on such an understanding, the technical solutions of the present embodiments essentially or the part contributing to the prior art may be implemented in a form of a software product. The software product is stored in a readable storage medium, such as a floppy disk, a universal serial bus (USB) flash drive, a removable hard disk, a read-only memory (ROM), a random access memory (RAM), a magnetic disk, or an optical disc of a computer, and includes several instructions for instructing a computer device (which may be a personal computer, a server, a network device, and the like) to perform the methods described in the embodiments of the present invention.

The foregoing describes in detail a method for managing a hardware resource, a method for querying a location of a hardware resource, and a related apparatus that are provided in the embodiments of the present invention. A person of ordinary skill in the art may, based on the idea of the present embodiments, make modifications with respect to the specific implementation manners and the application scope. Therefore, the content of this specification shall not be construed as a limitation to the present embodiments.

What is claimed is:

1. A method in a virtualized network function (VNF) network comprising:
   receiving, by a network functions virtualization orchestrator (NFVO) in the VNF network, an instantiated message sent by an operation support system (OSS), the instantiated message requesting a VNF to be instantiated, the instantiated message comprises location information of a hardware resource that a virtual machine running the VNF requests to allocate and an exclusive identity, the exclusive identity identifying that the hardware resource is exclusively occupied by the virtual machine;
   sending, by the NFVO, a hardware resource allocation request message to a virtualized infrastructure manager (VIM) of the VNF network according to the instantiated message, the hardware resource allocation request message requesting that the VIM allocate the hardware resource to the virtual machine, and the hardware resource allocation request message comprising the location information of the hardware resource and the exclusive identity;
   receiving, by the VIM, the hardware resource allocation request message; and
   allocating, by the VIM, the hardware resource at a corresponding location to the virtual machine according to the location information of the hardware resource.

2. The method according to claim 1, wherein the location information of the hardware resource comprises at least one of
   city information, equipment room information, cabinet information, a device identity, a port network identity, and a network interface identity.

3. The method according to claim 1, wherein sending the hardware resource allocation request message comprises:
   determining, by the NFVO according to the location information of the hardware resource, a VIM that manages the hardware resource; and
   sending, by the NFVO, the hardware resource allocation request message to the VIM that manages the hardware resource.

4. The method according to claim 1, further comprising:
   receiving, by the NFVO, a hardware resource adjustment request message sent by the VNF, the hardware resource adjustment request message comprising location information and adjustment information of a hardware resource that the VNF requests to adjust; and
   forwarding, by the NFVO, the hardware resource adjustment request message to the VIM, to request that the VIM adjust the hardware resource at a corresponding location.

5. The method according to claim 1, further comprising:
sending, by the NFVO, the instantiated message to a virtualization network functions manager (VNFM) of the VNF network.

6. The method according to claim 1, wherein the hardware resource includes a CPU, a memory, and a hard drive.

7. A virtualized network function (VNF) system comprising:
- a network functions virtualization orchestrator (NFVO) comprising a processor, and a non-transitory computer readable storage medium storing a program for execution by the processor, the program including instructions to
  - receive an instantiated message sent by an operation support system (OSS), the instantiated message requesting a VNF to be instantiated, the instantiated message comprising location information of a hardware resource that a virtual machine running the VNF requests to allocate and an exclusive identity, the exclusive identity identifying that the hardware resource is exclusively occupied by the virtual machine, and
  - send a hardware resource allocation request message to an virtualized infrastructure manager (VIM) according to the instantiated message, the hardware resource allocation request message requesting that the VIM allocate the hardware resource to the virtual machine, and the hardware resource allocation request message comprising the location information of the hardware resource and the exclusive identity; and
- the VIM, the VIM comprising a processor, and a non-transitory computer readable storage medium storing a program for execution by the processor, the program including instructions to
  - receive the hardware resource allocation request message, and
  - allocate the hardware resource at a corresponding location to the virtual machine according to the location information of the hardware resource.

8. The system according to claim 7, wherein the location information of the hardware resource comprises at least one of city information, equipment room information, cabinet information, a device identity, a port network identity and a network interface identity.

9. The system according to claim 7, wherein the instructions to send a hardware resource allocation request message at the NFVO comprises instructions to:
- determine, according to the location information of the hardware resource, a VIM that manages the hardware resource; and
- send the hardware resource allocation request message to the VIM that manages the hardware resource.

10. The system according to claim 7, wherein the program of the NFVO further comprises instructions to:
- receive a hardware resource adjustment request message sent by the VNF, wherein the hardware resource adjustment request message comprises location information and adjustment information of a hardware resource that the VNF requests to adjust; and
- forward the hardware resource adjustment request message to the VIM, to request that the VIM adjust the hardware resource at a corresponding location.

11. The system according to claim 7, wherein the program of the NFVO comprises further instructions to:
send the instantiated message to a virtualization network functions manager (VNFM) of the VNF network.

12. The system according to claim 7, wherein the hardware resource includes a CPU, a memory, and a hard drive.

* * * * *